Figure 4:
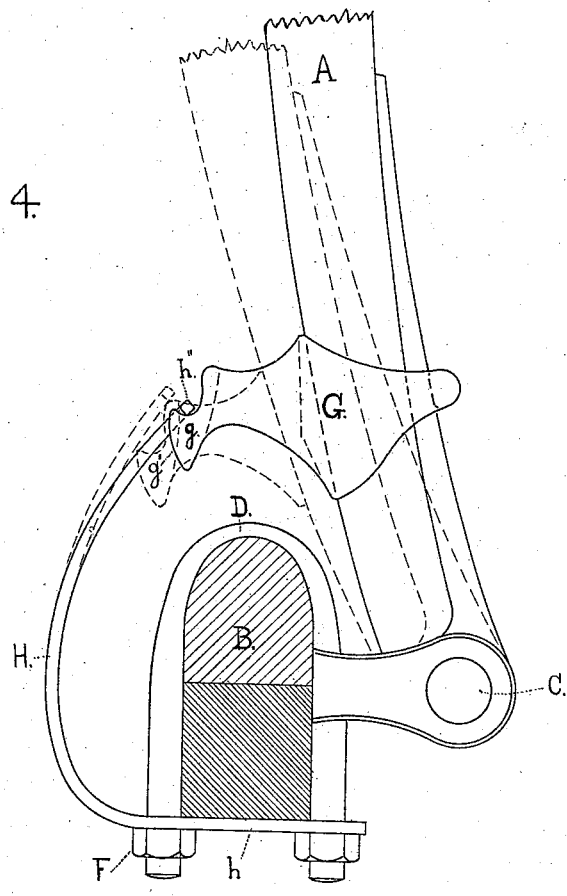

(No Model.) 2 Sheets—Sheet 1.
C. H. & G. D. SAMPSON.
THILL HOLDER.
No. 372,770. Patented Nov. 8, 1887.
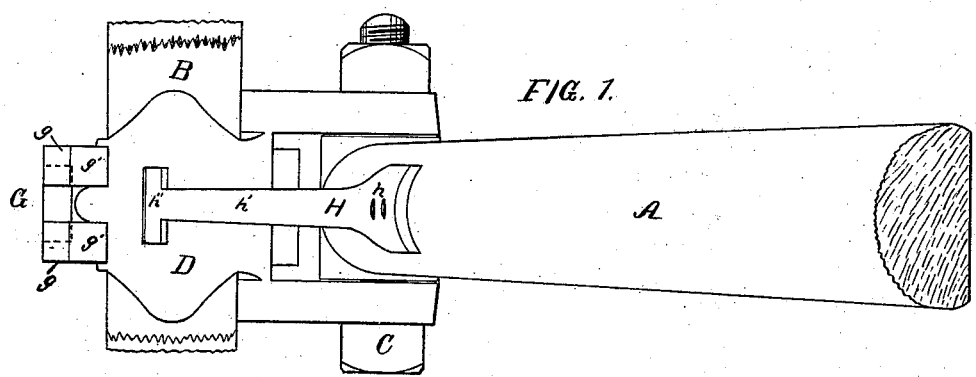
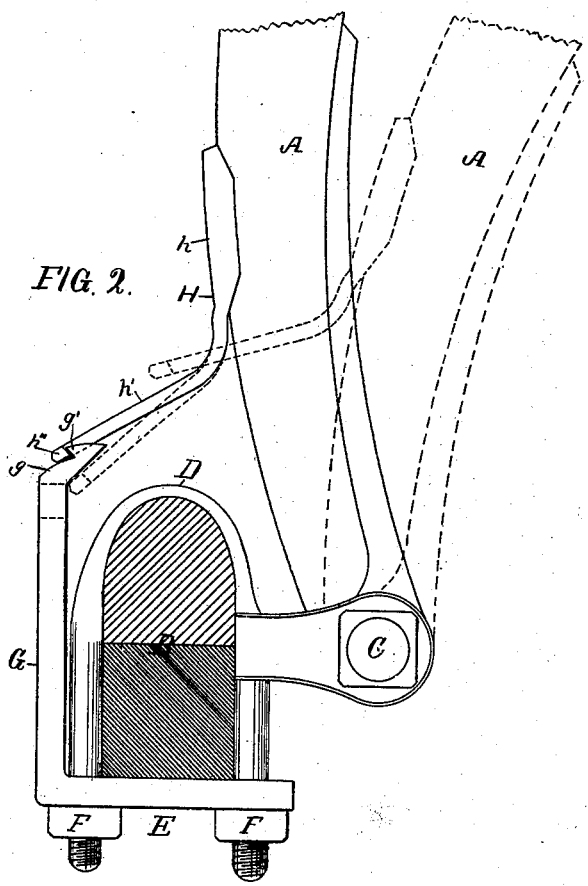
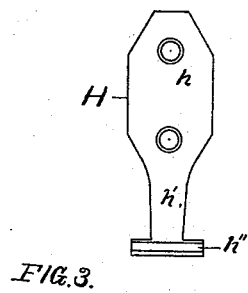
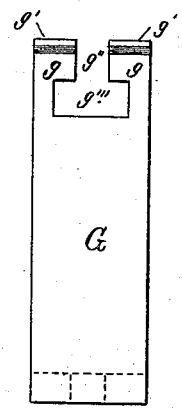
Witnesses
John Morris
Emma Elmore
Inventor
Charles H. Sampson
George D. Sampson
By their Attorney
Jas. F. Williamson (No Model.) 2 Sheets—Sheet 2.

C. H. & G. D. SAMPSON.
THILL HOLDER.

No. 372,770. Patented Nov. 8, 1887.

UNITED STATES PATENT OFFICE.

CHARLES H. SAMPSON AND GEORGE D. SAMPSON, OF MINNEAPOLIS, MINNESOTA.

THILL-HOLDER.

SPECIFICATION forming part of Letters Patent No. 372,770, dated November 8, 1887.

Application filed July 18, 1887. Serial No. 244,592. (No model.)

*To all whom it may concern:*

Be it known that we, CHARLES H. SAMPSON and GEORGE D. SAMPSON, citizens of the United States, and residents of the city of Minneapolis, county of Hennepin, State of Minnesota, have invented certain new and useful Improvements in Thill-Holders, of which the following is a specification, reference being had to the accompanying drawings.

Our invention has for its object to provide a simple and efficient thill-holder which will automatically lock the thill in its raised position, such as is desirable to keep it out of the way when the vehicle is not in use, or for hitching in the horse, and which may be automatically released from its raised position and lowered by raising the thill slightly beyond its locked position.

Our invention consists of the construction hereinafter fully described, and particularly pointed out in the claim.

In the drawings, like letters referring to like parts,—Figure 1 is a plan of our device in its unlocked position, looking from the front. Fig. 2 is a side elevation of the same, the locked position being shown in full lines and the unlocked position in dotted lines; and Fig. 3 is a plan view of the parts of our locking device as they appear detached from the thill and axle. Fig. 4 is a side elevation showing the keeper attached to the thill and the spring-latch attached to the axle, illustrating the interchangeable character of the two parts of our device.

A is the thill, and B the axle, of an ordinary buggy or other vehicle.

C is the coupling, connecting the thill and axle.

D is the coupling-clip, embracing the axle and secured thereto by the bar E and nuts F, working on the screw-threaded extremities of said clip.

G is what we call a "catch" or "keeper," and constitutes one of the reciprocal parts of our interlocking device or thill-holder. It is in the instance shown composed of a flat bar of iron continuous with the rear end of the bar E, but bent at right angles to the same, and which extends upward a half-inch or more above the level of the axle and clip. At its upper and outer extremity it is provided with a downwardly and forwardly projecting portion, $g$, provided with hooks $g'$. The central part of this inclined portion $g$ is cut away, as shown at $g''$, and a part of the body of G is cut away directly in the rear of $g$, as shown at $g'''$, the two cut-away portions communicating with each other and forming a T-headed slot.

H is the latch or T-headed spring-hook, constituting the other reciprocal part of our locking device. It consists of a flat stiff piece of spring metal bent upon itself at or near its middle point, so that its two parts form an obtuse angle with each other, the one part, $h$, being flattened out and formed concave below and attached to the thill, and the other or spring part, $h'$, extending upward and rearward at an acute angle to the body of the thill, and provided at its extremity with a T-shaped head, $h''$. The catch G and the latch H are both in a common vertical plane, and the head $h''$, the front of the hooks $g'$, and the transverse slot $g'''$, when the spring $h'$ is in its normal position, are all in the arc of a common circle described from the coupling C as a center. The front part of the hooks $g'$ are provided with a cam-surface, and the intervening surface of $g$, between the hooks and the transverse slot $g'''$, is also a cam-surface for bearing against the head $h''$ and springing it out of its normal arc. The slot $g''$ is of a size adapted to pass freely the stem of the spring-latch $h'$, and the transverse slot $g'''$ is large enough to permit the easy passage of the head $h''$. The under part of the inclined portion $g$ is also a cam-surface, serving to bear against the head $h''$ and spring it out of its normal arc when the thill is being lowered.

The catch G and the latch H are so set in the common arc that their interlocking parts $h''$ and $g'$ will be in engagement when the thill is in its raised position, and care is taken not to make this the extreme limit of the thill's upward movement.

The operation is clear from the description. Suppose the thill to be on the ground and it is desired to fasten it up in its raised position and lower it therefrom. As the thill is raised and nears its locking position, the head $h''$ will strike the cam-surface on the hooks $g'$ and be sprung upward and forward until it reaches the hook shoulder or offset, when it will engage therewith and hold up the thill. If the thill be raised higher, the head $h''$ will pass on up the cam-surface until it reaches the transverse slot $g'''$, when it will fall into the slot, springing downward into its normal arc, and, if the thill be then lowered, the head $h''$ will pass down through the slot $g'''$ and below the inclined cam part $g'$. G and H thus constitute reciprocal interlocking parts, which engage with each other at a certain point only in the arc of the thill's upward movement, holding the thill in its raised position, and which may be disengaged by a further movement of the thill in the same direction, allowing the thill to be lowered at will.

It will be readily understood that the locations of the parts G and H are interchangeable, as is shown in Fig. 4. The catch G may be attached to the thill and the spring-latch H to the axle, or some other suitable convenient part of the vehicle, which is fixed with reference to the vertical movement of the thills. They might be attached so that their edges would be in the vertical plane as to the inside or outside of the thill and clip; or they might be attached to the under side of the axle and thill. It will also be readily understood that the device is also applicable to all vehicles having falling tongues, and generally wherever it is desirable to lock a movable arm to a fixed support at some point only in the arc of its movement.

What we claim, and desire to secure by Letters Patent of the United States, is as follows:

In combination with the vehicle-thill A and axle B, the spring-latch H, provided with the T-headed extremity $h''$, and the catch or keeper G, provided with the cam-surface $g$, the hooks $g'$, the longitudinal slot $g''$, and the transverse slot $g'''$, said latch and keeper being attached one to the thill and the other to the axle, and having their free ends projecting toward each other, substantially as described, for the purpose set forth.

CHARLES H. SAMPSON.
GEORGE D. SAMPSON.

In presence of—
EMMA F. ELMORE,
JAS. F. WILLIAMSON.